United States Patent
Naka

(10) Patent No.: US 7,932,976 B2
(45) Date of Patent: Apr. 26, 2011

(54) REFLECTOR, LIQUID CRYSTAL DISPLAY DEVICE HAVING REFLECTOR, METHOD OF MANUFACTURING REFLECTOR, AND METHOD OF MANUFACTURNIG LIQUID CRYSTAL DISPLAY DEVICE

(75) Inventor: Kenichirou Naka, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 1063 days.

(21) Appl. No.: 11/705,058

(22) Filed: Feb. 12, 2007

(65) Prior Publication Data
US 2007/0188683 A1 Aug. 16, 2007

(30) Foreign Application Priority Data
Feb. 13, 2006 (JP) .................................. 2006-35514

(51) Int. Cl.
G02F 1/1335 (2006.01)
(52) U.S. Cl. ........................................................ 349/114
(58) Field of Classification Search .................... None
See application file for complete search history.

(56) References Cited

U.S. PATENT DOCUMENTS

| | | | |
|---|---|---|---|
| 6,452,653 B1 | 9/2002 | Yamanaka et al. | |
| 6,469,759 B2 * | 10/2002 | Jang et al. | 349/113 |
| 2003/0086046 A1 * | 5/2003 | You | 349/149 |
| 2004/0238969 A1 * | 12/2004 | Chen | 257/786 |

FOREIGN PATENT DOCUMENTS

| | | |
|---|---|---|
| CN | 1281156 | 1/2001 |
| JP | 2002-207214 | 7/2002 |
| JP | 3394926 | 1/2003 |
| JP | 2004-37946 | 2/2004 |

OTHER PUBLICATIONS

Chinese Patent Office issued a Chinese Office Action dated Sep. 4, 2009, Application No. 2007100789027.

* cited by examiner

Primary Examiner — David Nelms
Assistant Examiner — Lucy P Chien
(74) Attorney, Agent, or Firm — Young & Thompson

(57) ABSTRACT

A reflector for reflecting incident light from outside includes an insulating film being formed on a substrate and including multiple concavities and convexities, and a metal film formed on the insulating film. Respective convex portions constituting the multiple concavities and convexities are formed into shapes in which positions of peak portions relative to the entire convex portions are tilted in one direction when viewed from a direction of a normal line of the substrate.

7 Claims, 12 Drawing Sheets

FIG. 1A COATING
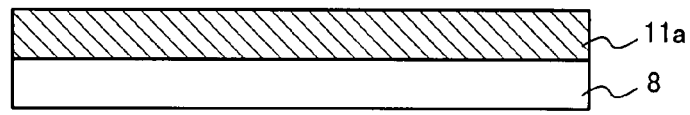
FIG. 1B EXPOSURE
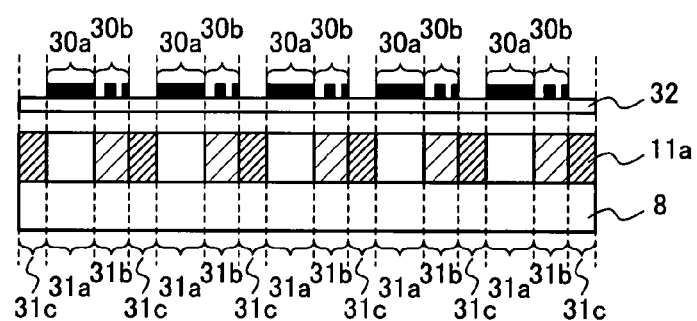
FIG. 1C DEVELOPMENT
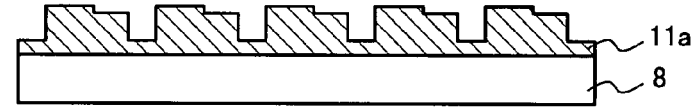
FIG. 1D BAKING
FIG. 1E AL FILM DEPOSITION
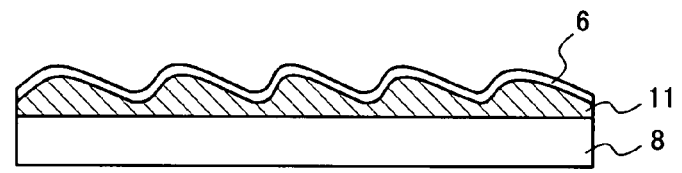

TRIANGLES
(SHIELDING PATTERN
USING SIDES OF
TRIANGLES)

HEXAGONS
(SHIELDING PATTERN
USING SIDES OF
HEXAGONS)

PENTAGONS
(SHIELDING PATTERN
USING SIDES OF
PENTAGONS)

TRIANGLES
(SHIELDING PATTERN
USING TRIANGLES)

HEXAGONS
(EXAMPLE OF RANDOMLY
MOVING INTERSECTIONS
OF SIDES OF HEXAGONS)

CIRCLES

WAVY LINES

WINDING LINES

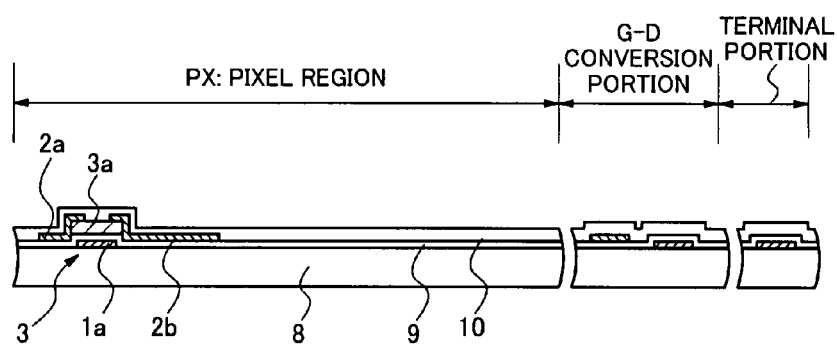
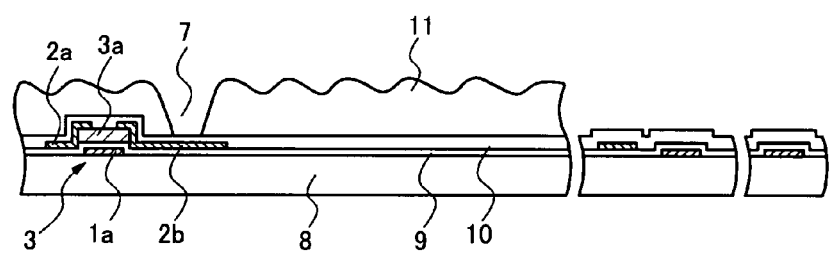
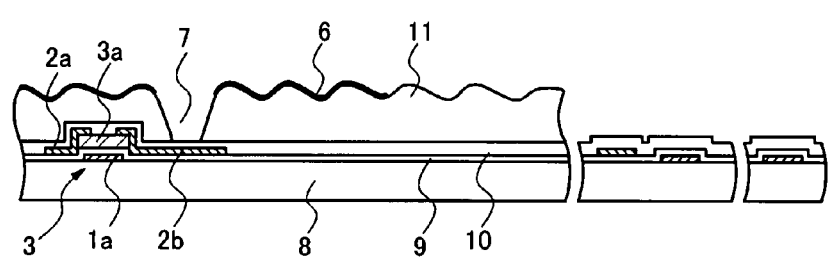
FIG. 10A
FIG. 10B
FIG. 10C

COATING

EXPOSURE

DEVELOPMENT

BAKING

AL FILM DEPOSITION

REFLECTOR, LIQUID CRYSTAL DISPLAY DEVICE HAVING REFLECTOR, METHOD OF MANUFACTURING REFLECTOR, AND METHOD OF MANUFACTURNIG LIQUID CRYSTAL DISPLAY DEVICE

BACKGROUND OF THE INVENTION

1. Field of the Invention

The present invention relates to a reflector, a liquid crystal display (LCD) device having the reflector, a method of manufacturing a reflector, and a method of manufacturing an LCD device having the reflector. More specifically, the present invention relates to a structure of a reflector to be formed on a substrate of an LCD device, a reflective or semi-transmissive LCD device having the reflector, and methods of manufacturing the reflector and the LCD device having the reflector.

2. Description of the Related Art

LCD devices have favorable features of small sizes, thin profiles, and lower power consumption and are therefore put into practical use in a broad range of applications including office automation equipment, and portable devices. Unlike a cathode ray tube (CRT) or an electroluminescence (EL) display device, LCD devices do not include a light-emitting function by themselves. Accordingly, a transmissive LCD device is provided with a backlight source so that displays are controlled by transmission amount of backlight through an LCD panel. By use of the backlight, this transmissive LCD device can achieve a bright screen without depending on ambient environments. On the other hand, this type of the LCD device has a problem of short operating time in mobile use particularly when it is driven by a battery power source. This is because the backlight source consumes high power during display operation.

A reflective LCD device configured to display images by use of ambient light has been proposed in order to solve the problem of high power consumption by the backlight source. This reflective LCD device is provided with a reflector instead of the backlight source, so that displays are controlled by transmission amount of the ambient light reflected by the reflector through the LCD panel. Thus, by employing such a reflective LCD device, it is possible to aim to achieve reduction in power consumption as well as reduction in size and weight. In the meantime, this LCD device has a problem of deterioration in visibility in a dark ambient environment.

Accordingly, there is disclosed an LCD device in which each pixel includes a transmissive region and a reflective region in order to prevent an increase in power consumption attributable to the backlight source and deterioration in visibility attributable to the ambient environment. An LCD device having both functions of the transmissive LCD device and the reflective LCD device will be hereinafter referred to as a semi-transmissive reflective LCD device. Usually, this semi-transmissive reflective LCD device is configured to form a reflector at a part (a reflective region) of an active-matrix substrate including switching elements such as thin film transistors (TFTs) and to generate diffuse reflection of ambient light by use of this reflector.

The reflective LCD device or the semi-transmissive reflective LCD device is provided with a resin layer having a concavo-convex shape and then the reflector is formed by providing a reflective film on the resin layer. This LCD device pursues a bright display under a condition of strong external light by applying this structure. The concavo-convex shape of the resin layer is formed by exposing and developing portions to be concavities and convexities by a photolithography method and then subjecting these portions to a heat treatment. However, by using the manufacturing methods and the structures of the related art, it is difficult to fabricate a reflector having a sufficiently bright reflection characteristic at low costs.

SUMMARY OF THE INVENTION

Accordingly, an exemplary feature of the present invention is to provide a structure of a reflector having a bright reflection characteristic obtained by effectively reflecting incident light toward a viewer, and to provide a method of manufacturing the reflector.

Another exemplary feature of the present invention is to provide an LCD device including the reflector and a method of manufacturing the LCD device.

A reflector according to the present invention is configured to reflect incident light from outside and includes an insulating film being formed on a substrate and having multiple concavities and convexities, and a metal film formed on the insulating film. Here, convex portions constituting the multiple concavities and convexities are formed into shapes in which the positions of peak portions respectively in the entire convex portions are tilted in one direction when viewed from a direction of a normal line of the substrate.

Another reflector according to the present invention is configured to reflect incident light from outside and includes an insulating film being formed on a substrate and having multiple concavities and convexities, and a metal film formed on the insulating film. Here, a tilted portion is a portion between a peak portion of each of the convex portions constituting the multiple concavities and convexities and a concave portion around the convex portion. As for the tilt angle of the tilted portion to the surface of the substrate, the tilt angle on a certain side is smaller than the tilt angle on another side.

Still another reflector according to the present invention is configured to reflect incident light from outside and includes an insulating film being formed on a substrate and having multiple concavities and convexities, and a metal film formed on the insulating film. Here, a tilted portion between each of the convex portions constituting the multiple concavities and convexities and a concave portion around the convex portion has a slope which is relatively longer on a predetermined side than a slope on another side.

Preferably, the concavities and the convexities are formed by arranging a pattern which applies at least a partial side of any of a polygon, a circle and an ellipse to any of the convex portion and the concave portion, or formed by arranging a pattern which applies any of a wavy line or a winding line to any of the convex portion and the concave portion.

Preferably, the insulating film is a resin film.

A liquid crystal display device according to the present invention includes a pair of substrates and a liquid crystal layer interposed between the pair of substrates, wherein a reflector having above feature is formed on either one of the pair of substrates.

A method of manufacturing a reflector according to the present invention for reflecting incident light from outside includes the steps of coating photosensitive resin on a substrate, exposing the photosensitive resin by use of a photomask having a light-shielding region where a pattern is formed in a size equal to or larger than a resolution limit, a first transmissive region where a pattern is formed in a size smaller than the resolution limit, and a second transmissive region having higher optical transmittance than the first transmissive region, performing development of the photosensitive resin after the exposure and forming three regions having different film thicknesses, subjecting the photosensitive resin to a heat treatment after the development, and forming a reflective film on the photosensitive resin after the heat treatment.

Preferably, the photomask includes a pattern in which any of polygons, circles, and ellipses are arranged in a plane direction while a side of any of each polygon, circle, and ellipse constitutes the light-shielding region, and the first transmissive region is located adjacent to the light-shielding region.

Preferably, the photomask includes a pattern in which any of wavy lines and winding lines are arranged in a plane direction while any of each wavy line and winding line constitutes the light-shielding region, and the first transmissive region is located adjacent to the light-shielding region.

Preferably, the photomask includes a pattern in which any of polygons, circles, and ellipses in a plane direction while a side of any of each polygon, circle, and ellipse constitutes the second transmissive region, and the first transmissive region and the light-shielding region are located adjacent to each other in areas surrounded by sides of any of the polygons, circles, and ellipses.

Preferably, the photomask includes a pattern in which any of wavy lines and winding lines are arranged in a plane direction while any of each wavy line and winding line constitutes the second transmissive region, and the first transmissive region and the light-shielding region are located adjacent to each other at portions other than any of the wavy lines and winding lines.

Preferably, the pattern in the size smaller than the resolution limit is changed stepwise in the first transmissive region.

Preferably, a light-shielding pattern is not formed in the second transmissive region.

As described above, according to the present invention, the reflector is formed such that the respective convex portions constituting the concavities and convexities have the peak portions that are tilted in the same direction. Thus, it is possible to increase a reflective component in a required direction. In this way, it is possible to obtain a reflector having a bright reflection characteristic and a high visual quality LCD device including the reflector. As to the shapes of the peak portions tilted in the same direction, it is conceivable to employ any one of a configuration in which the tilt angle is relatively smaller on the light incident side and a configuration in which the length of the slope is relatively longer on the light incident side.

In the case of a diffuse reflector fabricated in accordance with a photolithography method of the related art, the light incident from outside is reflected isotropically by a cross section of the concavities and convexities while centering on a specular direction as shown in FIG. 7A. For this reason, the light scatters not only in the specular direction but also in the opposite direction relative to a viewer. On the contrary, in the case of the diffuse reflector according to the present invention, the tilt angle of the tilted portions on the light incident side is formed small, or alternatively, the length of the slopes on the light incident side is formed long. Accordingly, it is possible to condense the light efficiently along the direction of the normal line of the substrate (the direction toward the viewer) as shown in FIG. 7B. Moreover, it is possible to make efficient use of the incident light from various directions by arranging basic figures such as polygons or circles to form the concavities and convexities.

Further, according to the present invention, the photomask used for a photolithographic process is formed into a combination of the light-shielding region having the pattern in the size equal to or larger than the resolution limit, the first transmissive region having the pattern in the size smaller than the resolution limit, and the second transmissive region having the higher optical transmittance than the first transmissive region. In this way, it is possible to form three regions having different exposure amounts at the same time. This photomask can be fabricated in accordance with existing processes. Moreover, the process for fabricating the reflector is also simplified. Accordingly, the tact time is reduced and the production yield is improved. Due to these advantages, it is possible to fabricate the reflector having a bright reflection characteristic and the LCD device including the reflector at low costs.

BRIEF DESCRIPTION OF THE DRAWINGS

These and other objects and advantages and further description of the invention will be more apparent to those skilled in the art by reference to the description, taken in connection with the accompanying drawings, in which:

FIGS. 1A to 1E are cross-sectional process drawings schematically showing a method of manufacturing a reflector according to a first exemplary embodiment of the present invention;

FIGS. 10A to 10C, 11A and 11B are cross-sectional views to explain a method of manufacturing the semi-transmissive reflective LCD device according to the second exemplary embodiment of the present invention;

DETAILED DESCRIPTION OF THE PREFERRED EMBODIMENTS

Prior to explaining the preferred embodiments of the present invention, a reflector according to the related art and an LCD device using this reflector will be described below.

Figure 13:
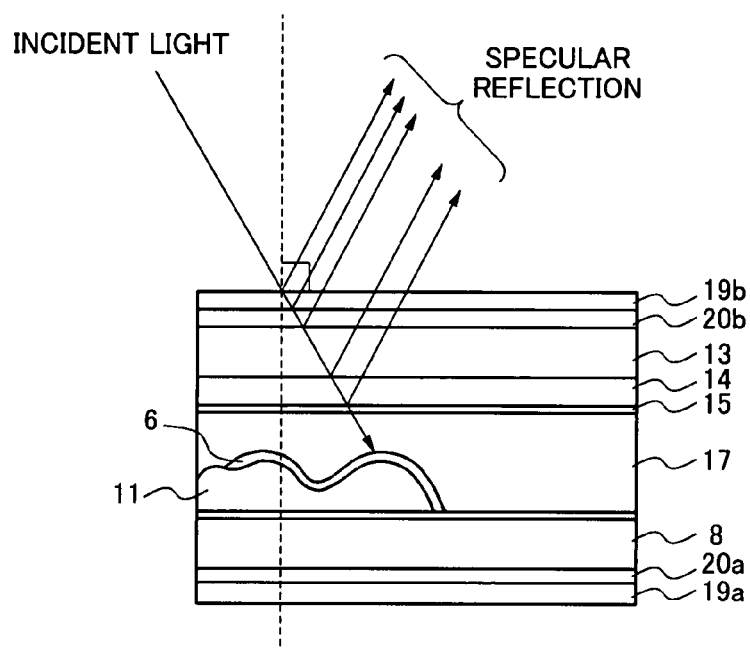
FIG. 13 is a view for explaining specular reflection of incident light.

An LCD device including a reflector often employs a diffuse reflector configured to diffuse incident light. It is because glare is apt to occur in a specular direction relative to a substrate by influences of various layers constituting the LCD device in a case where light is incident from a light source, and such glare may degrade display quality. As shown in FIG. 13, the various layers may include a polarizer 19b, a retarder 20b, a transparent insulating substrate 13, a counter electrode 15, a liquid crystal layer 17, and the like. Meanwhile, visibility is deteriorated by use of a mirror reflector due to darkness in directions other than the specular direction. The use of the diffuse reflector is therefore preferred.

Figure 7A:
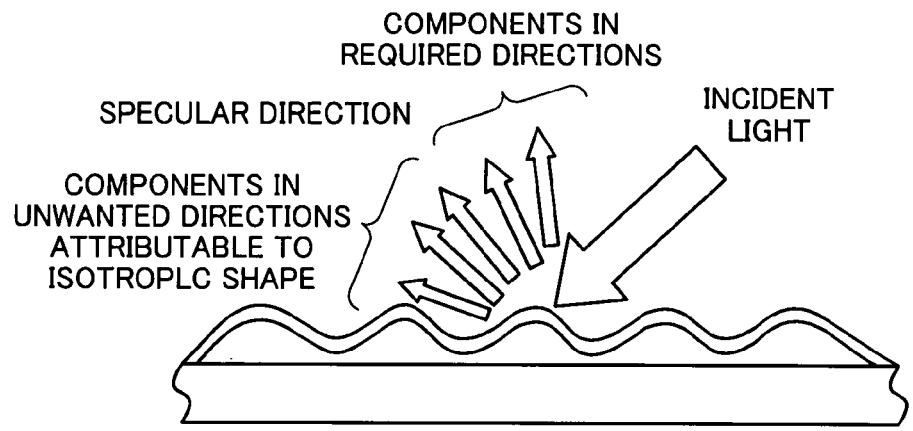
FIG. 7A is a diagram schematically showing the reflection characteristic of the reflector of the related art and FIG. 7B is a diagram schematically showing the reflection characteristic of the reflector of the first exemplary embodiment.
Figure 7B:
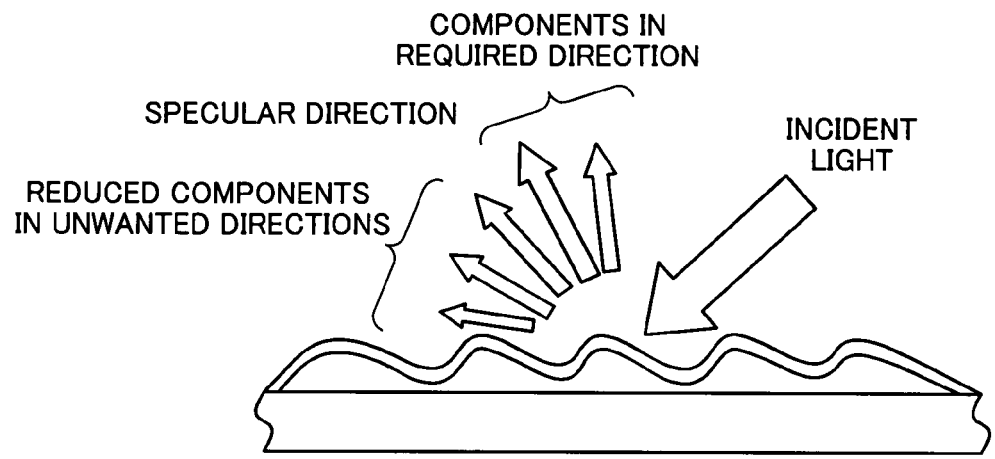
Figure 14A:
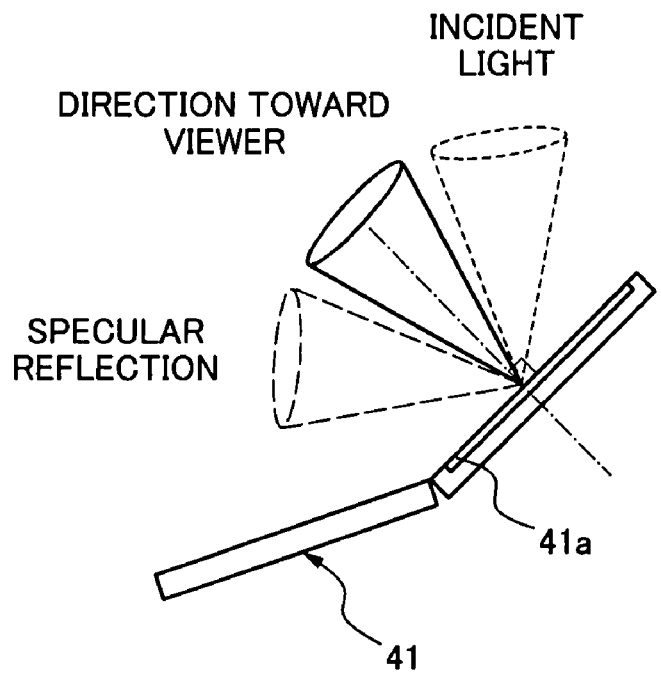
FIGS. 14A and 14B are schematic diagrams for explaining actual working conditions of an LCD device.
Figure 14B:
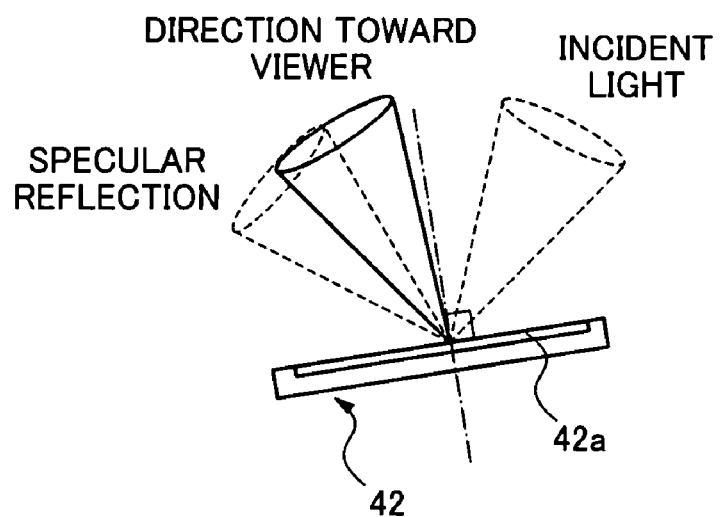
Figure 15A:
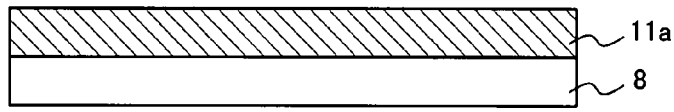
FIGS. 15A to 15E are cross-sectional process drawings for explaining a method of manufacturing a reflector of the related art.
Figure 15B:
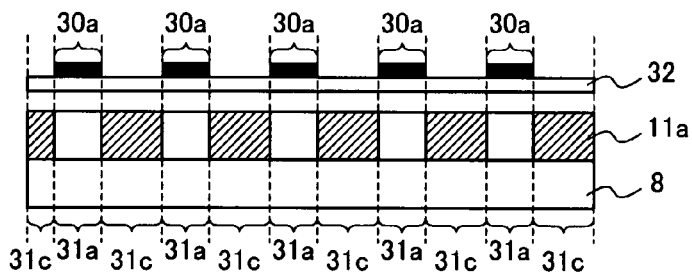
Figure 15C:
Figure 15D:
Figure 15E:
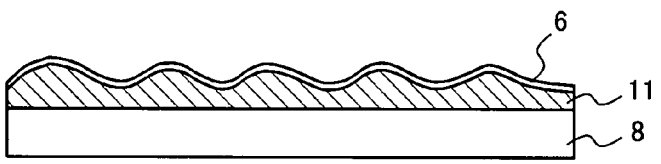

As a method for manufacturing a diffuse reflector of this kind, for example, Japanese Patent No. 3,394,926 discloses a method including a step of subjecting photosensitive resin to exposure by use of a photomask in which a total area of circles or polygons occupies 20% to 40% (inclusive) of a total area of the photomask. As shown in FIGS. 15A to 15E, this manufacturing method is configured to perform exposure on the photosensitive resin by use of the photomask having a circular or polygonal pattern in order to form two types of regions, namely, exposed regions and shielded regions. In a case where positive photosensitive resin is used, for example, the exposed regions are formed into concave portions while the shielded portions are formed into convex portions after development. Then, required slopes are formed on a surface by subjecting the photosensitive resin to a heat treatment. In a case where a photomask having a circular pattern is used, for example, it is possible to obtain only symmetric cross sections. As shown in FIG. 7A, external light incident on the reflector scatters isotropically while centering on a specular direction. Here, actual working conditions of an LCD device will be considered. As shown in FIG. 14A, when the LCD device is used for a cellular telephone 41, for example, an LCD panel 41a is used at a tilted angle relative to a horizontal direction. A direction of a viewer is shifted from the specular direction toward a vertical direction of the panel relative to the incident light. That is, this LCD device utilizes reflected light in the direction shifted from the specular direction toward the vertical direction of the panel. Meanwhile, as shown in FIG. 14B, an LCD panel 42a embedded in a device such as a personal digital assistant (PDA) 42 designed to be operated with a stylus is frequently used in an almost horizontal state. Therefore, this liquid crystal device is used at an angle closer to a specular component as compared to the cellular telephone 41. Here, reflected light in the specular direction is mainly used as compared to light close to the vertical direction of the panel. Nevertheless, very little light components in the reverse direction to the vertical direction of the panel relative to the specular direction are used for a display purpose. Accordingly, the reflector designed for isotropic light scattering causes light losses. Thus, the reflector having a bright reflection characteristic cannot be manufactured.

In the meantime, to improve a reflection characteristic in an arbitrary direction, Japanese Patent Laid-Open Publication No. 2002-207214 discloses a structure of a reflector in which a surface has a concavo-convex shape, and lines connecting convex portions out of the concavo-convex shape, lines connecting concave portions out of the concavo-convex shape, and lines connecting intermediate portions between the convex portions and concave portions include many components substantially orthogonal to a direction connecting the viewer to the light source. In this way, improvement of the reflection characteristic in an arbitrary direction is pursued. However, this method also employs a photomask similar to Japanese Patent No. 3,394,926. Thus, a cross-sectional shape of a component substantially orthogonal to the direction connecting the viewer to the light source is isotropic as shown in FIG. 7A. For this reason, this reflector also causes light losses as in the case of Japanese Patent No. 3,394,926. Thus, the reflector having a bright reflection characteristic cannot be manufactured.

To solve this problem, Japanese Patent Laid-Open Publication No. 2004-037946 discloses a structure of a reflector including a first tilted resin layer disposed on a substrate and a second tilted resin layer disposed on the first tilted resin layer. In this manufacturing method, the tilted resin layers are respectively fabricated in accordance with a mode of employing a method using a halftone mask according to a shifter method, a mode of controlling a film loss by use of light interference while using a mask having two types of rectangles in different sizes, and a mode of performing exposure while moving a photomask in parallel. Nevertheless, it is complicated to design and fabricate the halftone masks according to the shifter method. Meanwhile, the mask having the two types of rectangles in the different sizes uses the light interference. Thus, precision of a mask pattern has a large impact on exposure accuracy. Hence it is difficult to obtain a uniform concavo-convex pattern. The mode of performing exposure while moving the photomask in parallel requires two exposure sessions while moving the photomask. Here, the concavo-convex shape is apt to vary because it is difficult to align an exposure position in the first session with an exposure position in the second session. In addition, it is necessary to repeat the photolithographic processes twice for forming the first tilted resin layer and the second tilted resin layer severally. For this reason, occurrence of variation in the shape attributed to misalignment of the photomasks and an increase in the number of processes lead to reduction in yields. Accordingly, it is difficult fabricate a reflector having a bright reflection characteristic at low costs.

A reflector according to a preferred embodiment of the present invention provides a diffuse reflector configured to diffuse and reflect incident light toward an arbitrary direction, which includes concavities and convexities in a shape such that peak portions are displaced in the same direction. Preferably, the shape such that the peak portions are displaced in the same direction is achieved by forming tilted portions between the peak portions of respective convex portions and concave portions around the convex portions such that a tilt angle is defined relatively smaller on a light incident side or that a length of a slop is relatively longer on the light incident side. In this way, a bright reflection characteristic is obtained by increasing components along a view direction by a viewer in an actual working condition. Moreover, this diffuse reflector is fabricated by use of a photomask which includes a combination of a light-shielding region having a pattern in a size equal to or larger than a resolution limit, a first transmissive region having a dot or stripe pattern in a size smaller than the resolution limit, and a second transmissive region having higher optical transmittance than the first transmissive region.

This photomask allows formation of anisotropic shapes of the concavities and convexities by one session of exposure, which has not been available by a conventionally used photolithography method configured to partially apply a pattern in a size equal to or larger than the resolution limit. In this way, it is possible to increase reflective components in a required direction while decreasing reflective components in unwanted directions. In addition, by forming the concavities and convexities by arranging basic figures such as polygons or circles, it is possible to reflect light that is incident from various directions efficiently toward the viewer. In this way, it is possible to obtain a reflector having a sufficiently bright reflection characteristic and a high visual quality LCD device including the reflector by simple manufacturing processes, at high yields and at low costs.

First Exemplary Embodiment

A reflector and a manufacturing method thereof according to a first exemplary embodiment of the present invention will be described with reference to the accompanying drawings. As shown in FIG. 1E, the reflector of this embodiment includes an insulating film 11 formed on a substrate 8 and provided with multiple concavities and convexities, and a metal film 6 formed on the insulating film 11. In particular, respective convex portions constituting the multiple concavities and convexities are formed into shapes in which positions of peak portions relative to the entire convex portions are tilted in the same direction when viewed from a direction of a normal line of the substrate 8.

Now, a method of manufacturing the reflector of this embodiment will be concretely described with reference to FIGS. 1A to 1E. First, as shown in FIG. 1A, positive photosensitive resin 11a is coated in a film thickness ranging from about 0.5 μm to 5 μm on the given substrate 8. In this embodiment, the film thickness is set approximately equal to 2.2 μm, for example. A transparent insulating substrate such as glass or plastics for fabricating an active-matrix substrate of an LCD device in a second exemplary embodiment to be described later is used herein as the given substrate 8, for example. As the positive photosensitive resin 11a, PC403 (product name) manufactured by JSR Corporation is used, for example.

Next, as shown in FIG. 1B, a photomask 32 is placed above the photosensitive resin 11a. Then, the photosensitive resin 11a is subjected to exposure by use of the photomask 32. This photomask 32 includes three regions which are a light-shielding region 31a provided with a light-shielding film 30a having a pattern in a size equal to or larger than a resolution limit, a first transmissive region 31b located adjacent to the fight-shielding region 31a and provided with a light-shielding film 30b having a pattern in a size smaller than the resolution limit, and a second transmissive region 31c where no pattern is formed. The first transmissive region 31b has higher optical transmittance than the light-shielding region 31a. Meanwhile, since no pattern is formed in the second transmissive region 31c, the second transmissive region 31c has higher optical transmittance than the first transmissive region 31b.

Figure 2A:
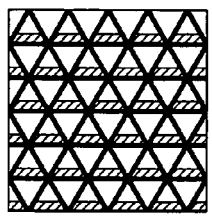
FIGS. 2A to 2H are plan views showing patterns of photomask used for manufacturing the reflector according to the first exemplary embodiment of the present invention.
Figure 2B:
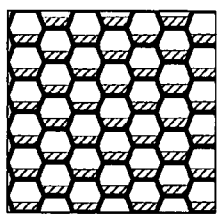
Figure 2C:
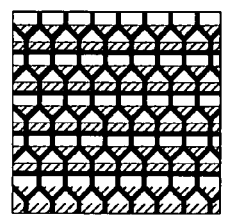
Figure 2D:
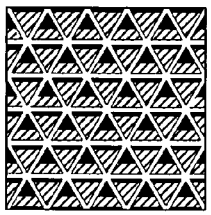
Figure 2E:
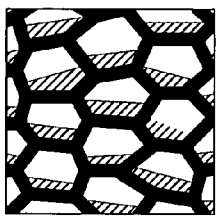
Figure 3A:
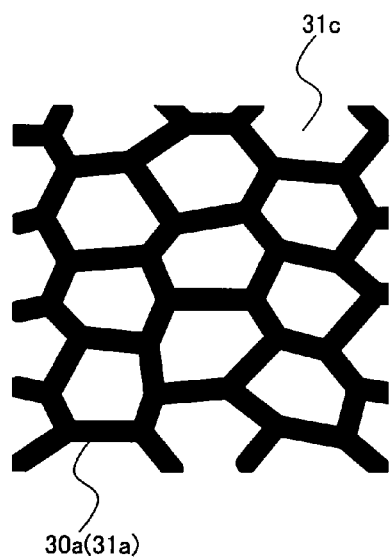
FIGS. 3A and 3B are plan views showing comparison of patterns between a photomask of the related art and a photomask used in the first exemplary embodiment.
Figure 3B:
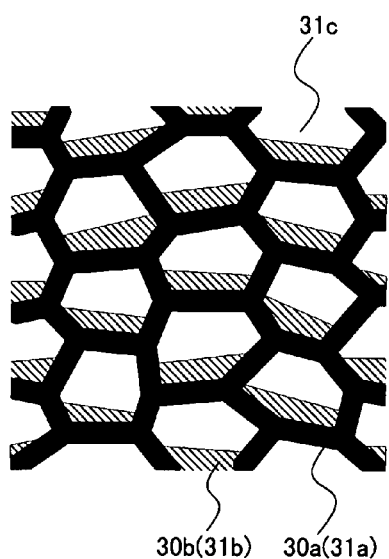

Widths, locations, and shapes of the light-shielding region 31a, the first transmissive region 31b, and the second transmissive region 31c can be set up as appropriate. Here, as shown in FIG. 2E and FIG. 3B, a mask in which hexagons each having a side thickness equal to about 2.5 μm and an average side length equal to about 18 μm are irregularly arranged in a plane direction with addition of line patterns having a thickness of about 1 μm located inside the sides in a given direction of the hexagons is used. Exposure is conducted through this mask by use of the g line (436 nm) and the h line (405 nm) from a high-pressure mercury lamp as a light source. In this case, the resolution limit is equal to about 2 μm. Since the light-shielding region 31a corresponding to the sides of the hexagons has the thickness of about 2.5 μm, the light-shielding region 31a has the larger size than the resolution limit and is therefore sufficiently imaged. The first transmissive region 31b where the line patterns having the thickness of about 1 μm falls below the resolution limit and is therefore not imaged sufficiently. Moreover, the light is partially shielded by the line patterns in the first transmissive region 31b. Therefore, an integrated value of light exposure in the first transmissive region 31b is smaller than an integrated value of light exposure in the second transmissive region 31c without patterns. In the meantime, the integrated value of light exposure in the first transmissive region 31b is higher than an integrated value of light exposure in the light-shielding region 31a. Here, the integrated value of the light exposure in the second transmissive region 31c is set to an appropriate amount so as to preserve approximately 50% of the photosensitive resin after development. When this photomask is used for performing exposure and development, it is possible to form a concavo-convex film 11 by arranging concave portions in random hexagonal shapes. This concavo-convex film 11 includes convex portions defined by ridges between the concave portions.

Figure 2F:
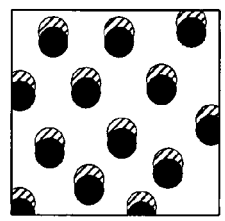
Figure 2G:
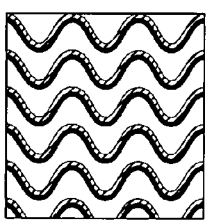
Figure 2H:
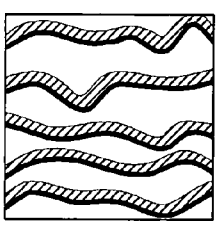

Here, the concavo-convex pattern is described as the shape defined by irregularly arranging the hexagons. However, the shape of the pattern is not particularly limited. For example, as shown in FIGS. 2A to 2C, it is also possible to arrange other polygons such as triangles, pentagons or hexagons regularly. When any of these photomasks is used for performing exposure and development, it is possible to form the concavo-convex film 11 by arranging concave portions in polygonal shapes such as triangles, pentagons or hexagons. This concavo-convex film 11 includes ridges between the concave portions. As shown in FIG. 2D, it is possible to form the inside of the polygons into light-shielding patterns. When the photomask shown in FIG. 2D is used for performing exposure and development, it is possible to form the concavo-convex film 11 by arranging triangular convex portions. Meanwhile, it is possible to form a circular or ellipsoidal pattern as shown in FIG. 2F. When the photomask shown in FIG. 2F is used for performing exposure and development, it is possible to form the concavo-convex film 11 by arranging circular convex portions. Moreover, it is also possible to modify the pattern into wavy lines as shown in FIG. 2G or winding lines as shown in FIG. 2H.

Although the line patterns having the thickness of about 1 μm are formed in the first transmissive region 31b in the foregoing case, it is satisfactory as long as the thickness is set equal to or below 2 μm in the case of using the above-described light source. Alternatively, it is also possible to form finer patterns by use of a light source having a shorter wavelength and a reduction exposure system. In this case, the i line of a high-pressure mercury lamp or an excimer laser is applicable to the light source having the shorter wavelength, for example.

Next, as shown in FIG. 1C, a development process is conducted by use of a developer such as tetramethyl ammonium hydroxide (TMAH), for example, thereby removing exposed portions. In this embodiment, the film thicknesses of the photosensitive resin 11a is adjusted to about 2.2 μm equivalent to the original film thickness for the light-shielding region 31a, about 1.5 μm for the first transmissive region 31b, and about 1.1 μm for the second transmissive region 31c after the development process.

Next, the photosensitive resin 11a formed into the concavities and convexities is subjected to baking at about 220° C. for about 2 hours. In this way, the concavo-convex film 11 is formed into a smooth concavo-convex shape as shown in FIG. 1D. Then, as shown in FIG. 1E, metal such as an Al—Nd alloy is deposited on the concavo-convex film 11 by sputtering or the like to form a reflective film 6.

Although the above-described manufacturing method employs the positive photosensitive resin as the photosensitive resin, it is also possible to employ negative photosensitive resin hereto. In this case as well, it is possible to form three regions having different light exposure amounts at the same time. As for the film thicknesses of the photosensitive resin after development, the first transmissive region 31b bears the thicker resin than that on the second transmissive region 31c, and the light-shielding region 31a bears the thicker resin than that on the first transmissive region 31b.

Moreover, in this embodiment, the light-shielding pattern in the first transmissive region 31b is formed along a certain side out of the sides of each polygon. Instead, it is possible to form a dot pattern or to combine the line pattern with the dot pattern. It is also possible to change density of the line pattern or the dot pattern stepwise so as to change the optical transmittance stepwise. Furthermore, the optical transmittance of the first transmissive region 31b can be set appropriately in response to the tilt angle. In a case where the optical transmittance of the second transmissive region 31c is assumed to be equal to 100%, the optical transmittance of the first transmissive region 31b is preferably set in a range from about 20% to about 80% inclusive.

Figure 4A:
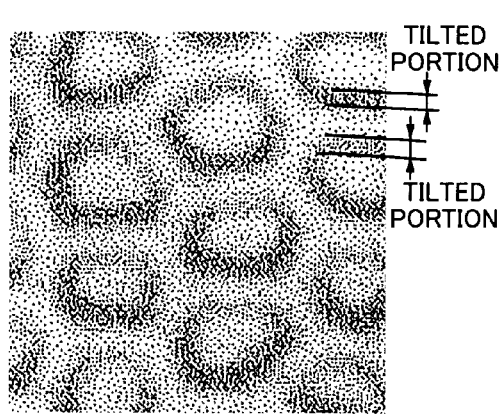
FIG. 4A is a photograph showing external appearance of a reflector fabricated by use of the photomask of the related art and FIG. 4B is a photograph showing external appearance of the reflector fabricated by use of the photomask of the first exemplary embodiment.

Next, effects of the reflector fabricated in accordance with the above-described method will be described. As shown in FIG. 4A, a reflector fabricated by use of a photomask of the related art shown in FIG. 3A has features of approximately equal tilt angles between tilted portions from peak portions of respective convex portions toward surrounding concave portions and of almost constant lengths of slopes. Dark portions in FIG. 4A represent the tilted portions from the peak portions of the respective convex portions toward the surrounding concave portions.

Figure 4B:
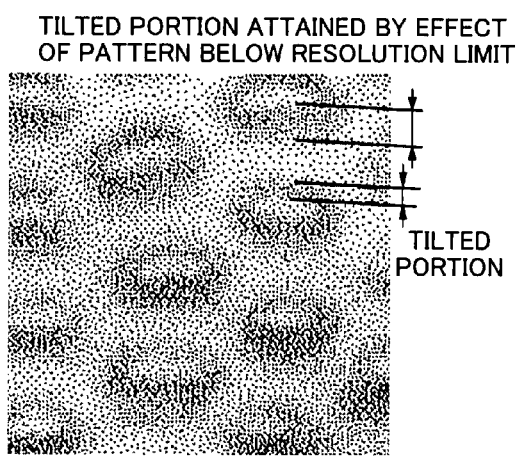

As shown in FIG. 4B, it is apparent that the reflector fabricated by use of the photomask of this embodiment shown in FIG. 3B has a smaller tilt angle at the tilted portion corresponding to the region having the pattern in the size smaller than the resolution limit, and a longer slope, corresponding to the tilted portion. Apparently, the length of the slope at the tilted portion, namely, a distance from the peak portion of the convex portion to the concave portion is increased. Dark portions in FIG. 4B represent the tilted portions from the peak portions of the respective convex portions toward the surrounding concave portions.

Figure 5:
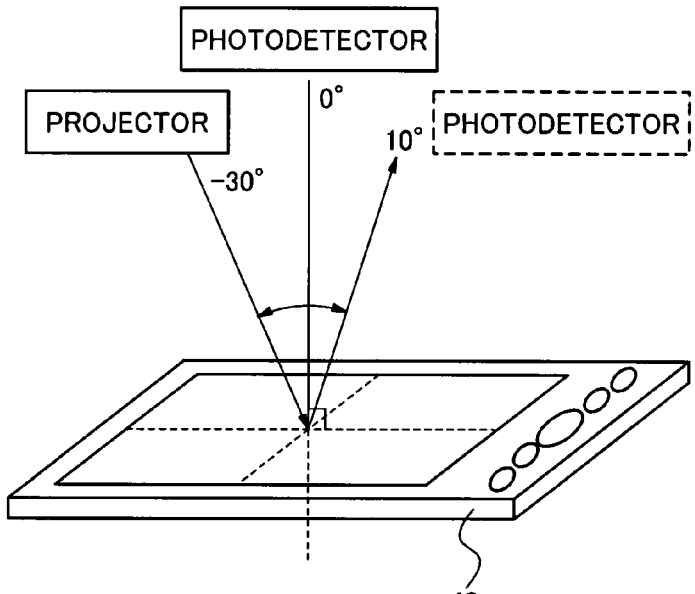
FIG. 5 is a diagram for explaining a method of measuring reflectance.
Figure 6:
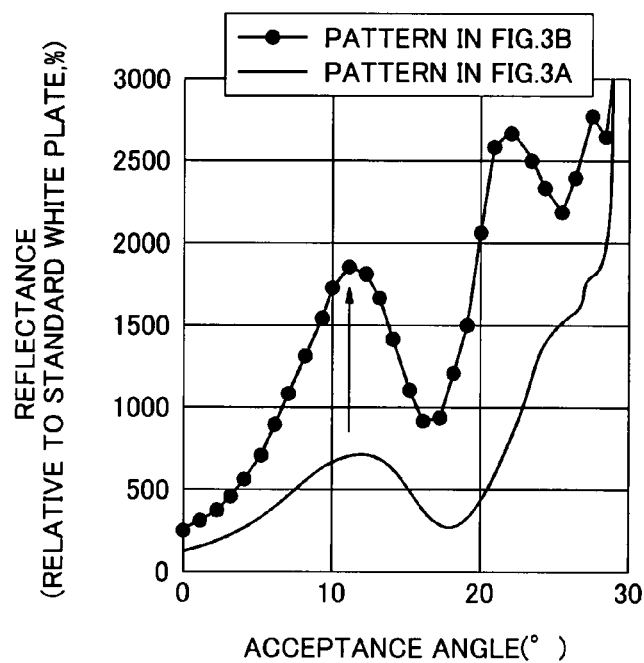
FIG. 6 is a graph showing reflection characteristics of the reflector of the related art and the reflector of the first exemplary embodiment.

Now, a method of measuring reflectance of the reflector will be described with reference to FIG. 5. A direction of a normal line of an LCD panel 40 including the reflector is defined as a reference, and reflection of light which is incident by use of a projector from a direction of −30° is captured with photodetectors located in a direction of 0° and in a direction of 10°. The reflectance is measured in this way. As shown in FIG. 6, when the light incident from the direction of −30° is diffused and reflected by a standard while plate, the reflectance of the reflected light captured in the direction of 0° is defined as 100%. The light incident from the direction of −30° is diffused and reflected by the reflector to be measured, and the reflected light is captured in the direction of 0°. FIG. 6 shows relative reflectance to the reflectance by the standard white plate. Here, WS-3 (product name) manufactured by Topcon Corporation is used as the standard white plate. This standard white plate is made of $BaSO_4$, for example.

In FIG. 6, a dotted solid line shows the reflectance of the reflector fabricated by use of the photomask of this embodiment. A solid line without dots shows the reflectance of the reflector fabricated by use of the photomask of the related art shown in FIG. 3A. It is apparent from FIG. 6 that the reflector fabricated by use of the photomask of this embodiment including the patterns in the smaller size than the resolution limit can improve the reflectance as compared to the reflector of the related art. As shown in FIG. 7A, the symmetric concavo-convex pattern of the related art reflects the incident light isotropically and thereby generates more components in unwanted directions. On the contrary, in the concavo-convex patter of this embodiment, the tilted portions each having a smaller tilt angle or a longer slope are located on the light incident side. In this way, it is possible to increase components to be reflected to a viewer while decreasing components in unwanted directions. In addition, as a result of sensory evaluation with eyes under the situation illustrated in FIG. 14A, it is confirmed that the display is obviously brighter and that deterioration of visibility is not observed when moving the position of the light source.

According to this embodiment, it is possible to form the concavities and convexities provided with the tilted portions having the smaller tilt angles or longer slopes by use of the photomask 32 that includes the light-shielding region 31a provided with the pattern in the size equal to or larger than the resolution limit, the first transmissive region 31b located adjacent to the light-shielding region 31a and provided with the pattern in the smaller size than the resolution limit, and the second transmissive region 31c without patterns which is located outside the first transmissive region 31b. It is possible to increase a reflective component in the direction of the normal line of the substrate by locating the tilted portions having smaller tilt angles or longer slopes on the light incident side. In other words, it is possible to increase the reflective components along a view direction by a viewer in an actual working condition. Therefore, it is possible to fabricate the reflector having a bright reflection characteristic at low costs while decreasing the components in unwanted directions.

Second Exemplary Embodiment

Figure 9:
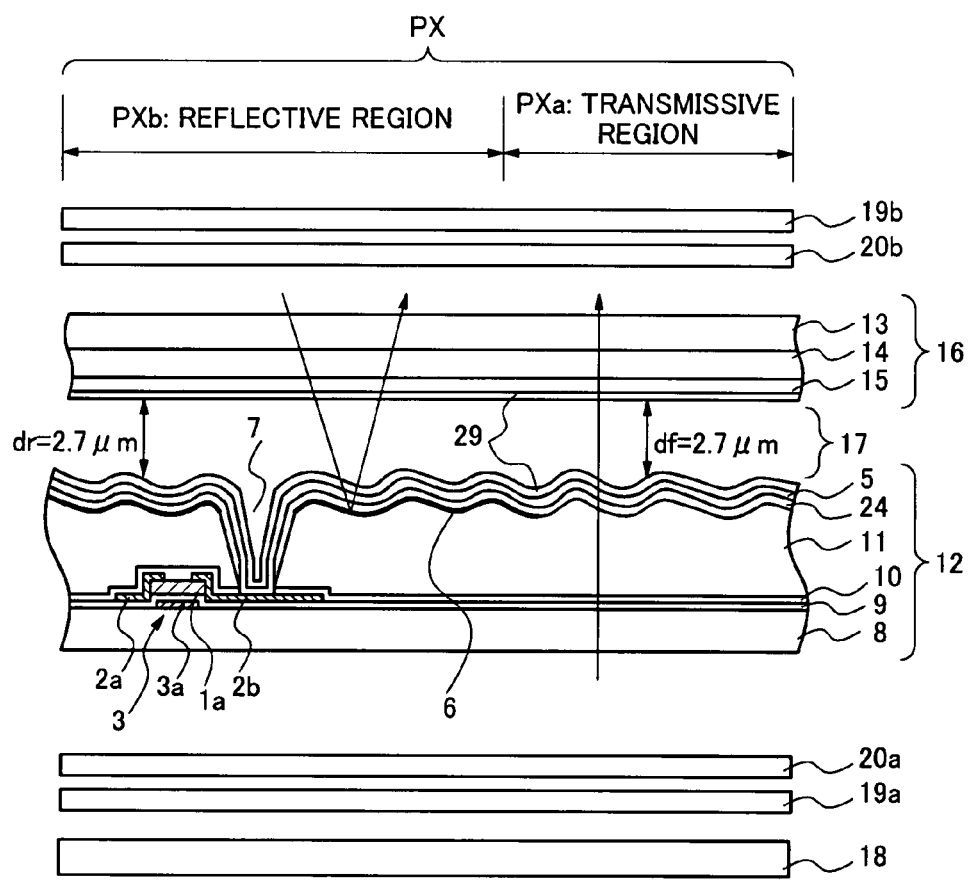
FIG. 9 is a cross-sectional view of the semi-transmissive reflective LCD device which is taken along the I-I line in FIG. 8.
Figure 12:
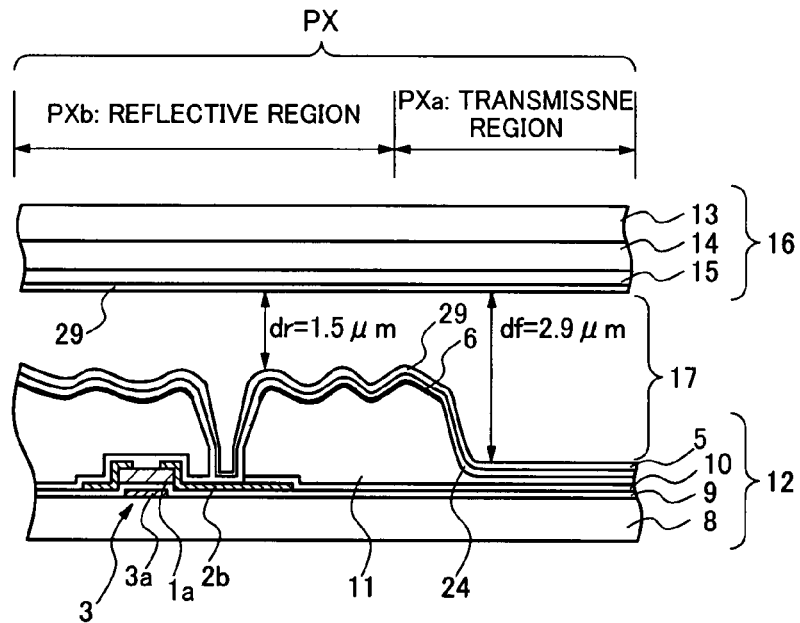
FIG. 12 is a cross-sectional view showing another structure of the semi-transmissive reflective LCD device according to the second exemplary embodiment of the present invention.

Next, an LCD device and a manufacturing method thereof according to a second exemplary embodiment of the present invention will be described with reference to the accompanying drawings. FIG. 9 shows a semi-transmissive reflective LCD device in which a twist angle is set approximately equal to 72° and a cell gap in a reflective region is equal to a cell gap in a transmissive region. FIG. 12 shows a semi-transmissive reflective LCD device in which a twist angle is set approximately equal to 0° and a cell cap in a reflective region is different from a cell gap in a transmissive region.

Figure 8:
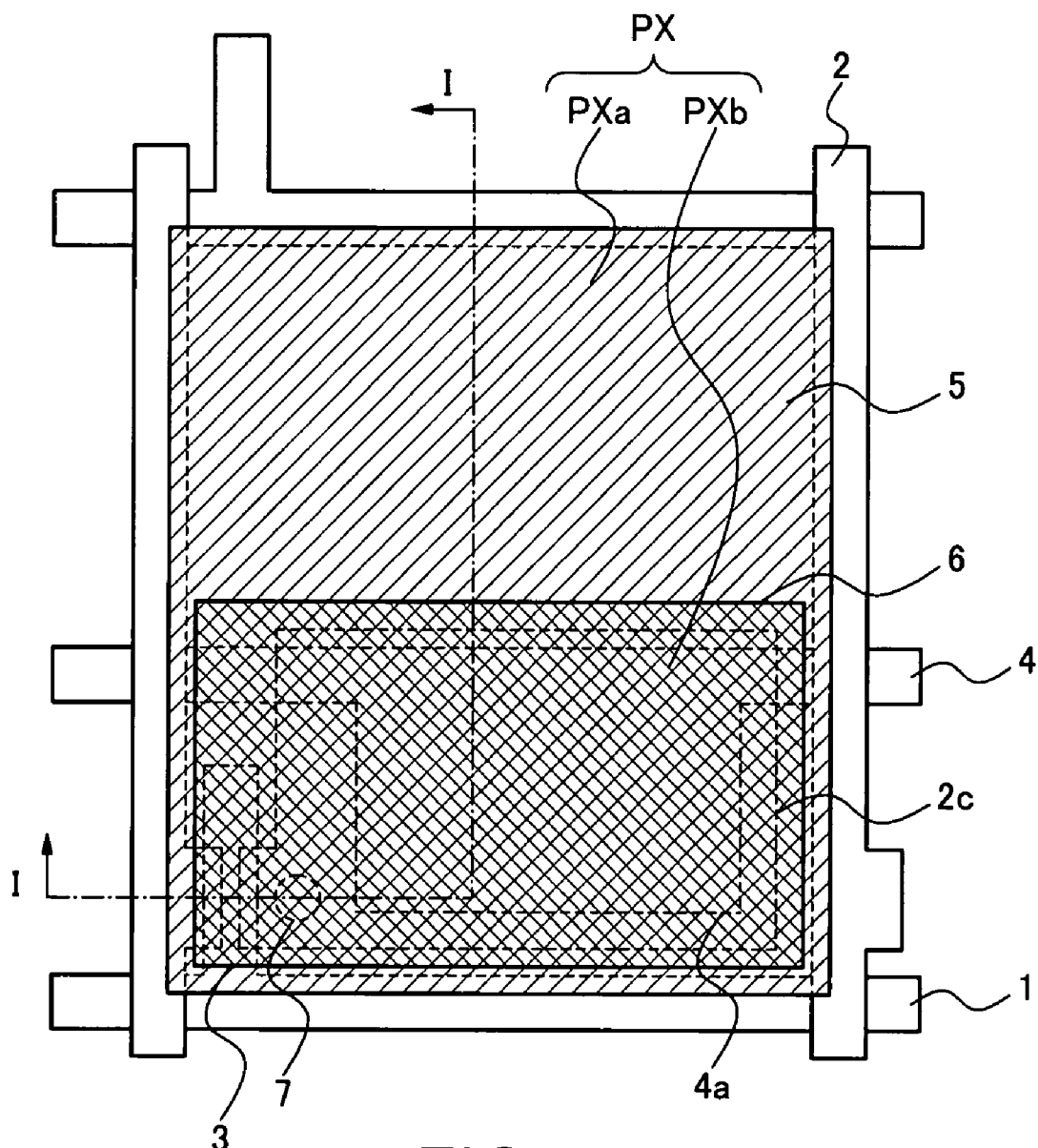
FIG. 8 is a plan view showing a structure of a semi-transmissive reflective LCD device according to a second exemplary embodiment of the present invention.

As shown in FIG. 8 and. FIG. 9, the semi-transmissive reflective LCD device of this embodiment includes an active-matrix substrate 12 on which thin film transistors (TFTs) 3 serving as switching elements are formed, a counter substrate 16, a liquid crystal layer 17 sandwiched between the two substrates 12 and 16, a backlight source 18 disposed on a back side of the active-matrix substrate 12, retarders 20a and 20b as well as polarizers 19a and 19b provided outside the active-matrix substrate 12 and outside the counter substrate 16, respectively. As to the retarders 20a and 20b, λ/4 plates are employed.

Moreover, the active-matrix substrate 12 includes a transparent insulating substrate 8, a gate line (a scan electrode) 1, a common storage line 4, an auxiliary capacitance electrode 4a, a gate electrode 1a, a gate insulating film 9, a semiconductor layer 3a, a drain electrode 2a, a source electrode 2b, a data line (a signal electrode) 2, a passivation film 10, and a pixel electrode. The gate electrode 1a, the gate insulating film 9, the semiconductor layer 3a, the drain electrode 2a, and the source electrode 2b collectively constitutes the TFT 3.

The gate line 1, the gate electrode 1a connected to the gate line 1, the common storage line 4, and the auxiliary capacitance electrode 4a are formed on the transparent insulating substrate 8. The gate insulating film 9 is formed on these constituents. The semiconductor layer 3a is formed on the gate insulating film 9. The drain electrode 2a and the source electrode 2b are drawn out of two ends of the semiconductor layer 3a and are formed on the gate insulating film 9. The drain electrode 2a is connected to the data line 2. The passivation film 10 is formed so as to cover the data line 2, the drain electrode 2a, the source electrode 2b, and the semiconductor layer 3a. A pixel electrode (a transparent electrode film 5) is connected to the source electrode 2b. The pixel electrode is provided one by one on an intersection of the signal electrode 2 and the scan electrode 1. Moreover, a pixel region PX includes a transmissive region PXa for transmitting incident light from the backlight source 18 and a reflective region PXb for reflecting external ambient light which is incident thereon. A concavo-convex film 11 made of an organic film or the like is formed on the passivation film in the pixel region PX. A reflective film 6 containing aluminum (Al) or an aluminum (Al) alloy, is formed in the reflective region PXb. This reflective film 6 is interposed between the concavo-convex film 11 and a second passivation film 24 and is thereby isolated from other surrounding constituents. Here, since it is not necessary to use the metal film formed in the reflective region PXb as an electrode, this metal film is referred to as the reflective film 6. This reflective film 6 is located above the TFT 3, so that the TFT 3 is covered with the reflective film 6. The transparent electrode film 5 made of indium tin oxide (ITO) or the like is formed on the entire surface of each pixel region PX while interposing the second passivation film 24 so as to cover the reflective film 6. The transparent electrode film 5 is connected to the source electrode 2b of the TFT 3 through a contact hole 7 provided on the concavo-convex film 11. The transparent electrode film 5 functions as the pixel electrode. An alignment film 29 made of polyimide or the like is formed on this transparent electrode film 5.

Meanwhile, the counter substrate 16 includes a transparent insulating substrate 13, a color filter 14, a black matrix (not shown), a counter electrode 15, an alignment film 29, and the like. The twist angle of this semi-transmissive reflective LCD device is set approximately equal to 720. In this way, a cell gap dr of the reflective region PXb is set equal to a cell gap df of the transmissive region PXa. Here, the cell gaps dr and df are set equal to 2.7 μm.

By covering the TFT 3 with the reflective film 6 as described previously, it is possible to block the external ambient light with the reflective film 6 when this light is incident on the TFT 3. In this way, it is possible to prevent occurrence of a malfunction attributable to an increase in an off-state current on the TFT 3 owing to a photoelectric effect caused by the incident light. However, if there is a short distance between the reflective film 6 and the TFT 3, a voltage (a gate voltage, in particular) to be applied to the TFT 3 may induce variation in electric potential of the reflective film 6 in an electrically floating state and may thereby disturb an electric field for liquid crystal control. Therefore, in this embodiment, the concavo-convex film 11 is also formed on the TFT 3 so as to secure the distance between the TFT 3 and the reflective film 6 by interposition of the concavo-convex film 11, thereby relieving an adverse effect on the reflective film 6 attributable to the voltage applied to the TFT 3.

Next, a method of manufacturing the semi-transmissive reflective LCD device having the above-described configuration will be described in the order of manufacturing steps with reference to FIG. 10A to FIG. 11B. Here, a method of manufacturing a gate-drain (G-D) conversion portion and a possible to form the three regions having different film thicknesses after development, the concavo-convex film 11 can be fabricated in fewer processes and at a high yield.

Although this embodiment uses the TFTs made of amorphous silicon as the switching elements, it is also possible to use TFTs made of polycrystalline silicon or other elements (such as thin film diodes (TFDs)). Moreover, the present invention can also achieve a fine characteristic when applied to a reflector for a passive-matrix LCD device without any switching elements.

Meanwhile, the semi-transmissive reflective LCD device of FIG. 9 employs the liquid crystal having the twist angle approximately equal to 72°. Moreover, the cell gap dr in the reflective region PXb is set equal to the cell gap df in the transmissive region PXa. That is, the concavo-convex film 11 is formed substantially in the same thickness in both of the reflective region PXb and the transmissive region PXa. In a case where the twist angle of the liquid crystal is set in a range from about 0° to 60°, it is possible to obtain optimum intensity of the outgoing light by setting the cell gap dr and the cell gap df to mutually different values.

FIG. 12 is a cross-sectional view showing a semi-transmissive reflective LCD device according to a first modified example of this embodiment. As shown in FIG. 12, in this semi-transmissive reflective LCD device, the twist angle of the liquid crystal is set approximately equal to 0° and the concavo-convex film 11 is formed only in the reflective region PXb. The cell gap df in the transmissive region PXa is set equal terminal portion to be located in a peripheral region of the active-matrix substrate 12 will also be described at the same time. The G-D conversion portion is configured to prevent a short circuit between outgoing lines caused by electrically conductive sealing. In a case where it is necessary to draw the drain electrode 2a electrically to outside, it is hardly possible to draw the drain electrode 2a directly to the outside without causing a short circuit due to structural restrictions. Therefore, this G-D conversion portion is provided in order to draw out the drain electrode 2a by use of the gate line 1 through the transparent electrode film 5.

First, as shown in FIG. 1A, metal such as Chromium (Cr) is deposited on the entire surface of the transparent insulating substrate 8 made of glass, plastics, or the like, and then the gate line 1, the gate electrode 1a, the common storage line 4, and the auxiliary capacitance electrode 4a are formed by removing the unnecessary metal by use of publicly-known photolithographic techniques and etching techniques. Note that the constituents not shown in FIG. 9 are illustrated in FIG. 8. Next, the gate insulating film 9 made of $SiO_2$, SiNx, SiOx or the like is formed on the entire surface. Then, the semiconductor layer 3a is formed by depositing and then patterning amorphous silicon (a-Si) or the like on the entire surface. Subsequently, after depositing metal such as Cr on the entire surface, the data line 2, the drain electrode 2a, the source electrode 2b, and a storage electrode 2c for capacitance, are formed by patterning. In this way, the TFT 3 is formed. Thereafter, the passivation 10 made of a SiNx film or the like for protecting the TFT 3 is deposited on the entire surface in accordance with a plasma-enhanced chemical vapor deposition (plasma CVD) method or the like. Meanwhile, the G-D conversion portion and the terminal portion are placed outside the pixel region PX on the transparent insulating substrate 8.

Next, as shown in FIG. 10B, photosensitive acrylic resin such as PC403, 415G or 405G manufactured by JSR Corporation is coated on the passivation film 10 by a spin coating method, for example, and the concavo-convex film 11 is formed in the pixel region PX by subjecting the photosensitive resin to exposure and development.

This concavo-convex film 11 is formed by performing exposure and development while using the photomask as shown in FIG. 1B, for example. To be more precise, the photomask used herein includes the light-shielding region 31a fabricated with a pattern in a size equal to or larger than the resolution limit so as to correspond to convex portions of the concavo-convex film 11, the first transmissive region 31b formed with a pattern in a size smaller than the resolution limit, the second transmissive region 31c designed to achieve higher optical transmittance than the first transmissive region 31b so as to correspond to concave portions, and a third transmissive region formed in positions corresponding to the contact hole 7, the G-D conversion portion, and the terminal portion where no pattern is provided. This third transmissive region has higher optical transmittance than the second transmissive region. For example, no light-shielding pattern is formed herein. The, photosensitive acrylic resin is subjected to exposure by use of the photomask having the above-described features.

Here, it is also possible to remove the photosensitive resin completely in the region for forming the contact hole 7 and the regions for forming the G-D conversion portion and the terminal portion by performing exposure at relatively higher optical intensity while using a different photomask.

Thereafter, the concavities and convexities are formed by use of an alkaline developer while utilizing differences in rates of dissolution with an alkaline solution among the concave portions, the convex portions, the contact hole 7, and the like. After development, the photosensitive acrylic resin is completely removed in the positions corresponding to the contact hole 7, the G-D conversion portion, and the terminal portion. Meanwhile, the concavo-convex film 11 is formed in the pixel region PX. Accordingly, it is possible to form the concave-convex shape of the concavo-convex film 11 in one session of exposure by use of the photomask having the above-described features. Specifically, the concavo-convex film 11 is formed such that the tilt angle is decreased in the tilted portion corresponding to the pattern having the smaller size than the resolution limit while the length of the slope at that portion is increased as shown in FIG. 4B. In other words, the concavo-convex film 11 is formed such that the distance between the peak portion of the convex portion and the concave portion is increased. The contact hole 7 is formed simultaneously with formation of the concavo-convex shape of the concavo-convex film 11, and the regions constituting the G-D conversion portion and the terminal portion are exposed. It is to be noted that although the concavo-convex film 11 is formed all over the pixel region PX including the reflective region PXb and the transmissive region PXa in the drawing, it is also possible to planarize the surface of the concavo-convex film 11 formed in the transmissive region Pxa without providing the concavities and the convexities. Moreover, in a case where the concavo-convex film 11 is formed in the transmissive region PXa, the acrylic film is decolorized by performing the exposure process on the entire surface so as to suppress attenuation of the incident light by the concavo-convex film 11. Thereafter, the acrylic film is cured at 220° C. for about one hour to finish the concavo-convex film 11 having the smaller tilt angle at the tilted portion or the longer slope.

As described previously, if a gap between the TFT 3 and reflective film 6 is too narrow, there is a risk of incurring variation in the electric potential of the reflective film 6 attributable to the gate voltage or the like to be applied to the TFT 3, and deterioration in the display quality as a consequence of the variation that disturbs the electric field for liquid crystal control. Therefore, the concavo-convex film 11 is also formed on the TFT 3 in this embodiment.

Next, the reflective film 6 is formed in the reflective region PXb out of the pixel region PX as shown in FIG. 10C. For example, metal such as aluminum (Al) or an aluminum (Al) alloy is deposited on the entire surface in accordance with a sputtering method or a vapor deposition method. Thereafter, only the reflective region PXb out of the pixel region PX is covered with a resist pattern. The reflective film 6 is formed by partially dry-etching or wet-etching the exposed metal while using this resist pattern as a mask. Here, the reflective film 6 is formed on the TFT 3 as well so that the external ambient light is not incident on the TFT 3. In this case, the reflective film 6 is formed in a region inside the gate lines 1 and the data lines 2 so as to suppress influences of the gate lines 1 and the data lines 2 and to cover the reflective film 6 completely with the transparent electrode film 5 later on. As shown in FIG. 8, the reflective film 6 is formed so as not to overlap the gate lines 1 or the data lines 2. Although this reflective film 6 is usually made of aluminum (Al) or an aluminum (Al) alloy, the material of the reflective film 6 is not limited only to these substances. It is possible to employ other metal as long as the metal has high reflectance and compatibility to a liquid crystal process.

Figure 11A:
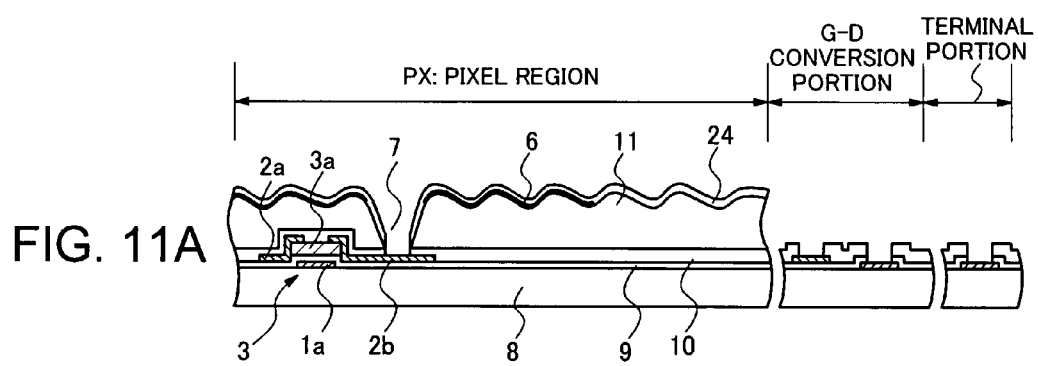

Next, as shown in FIG. 11A, an insulating film made of SiOx or the like, for instance, is deposited on the entire surface in accordance with the plasma CVD method or the like and selectively form a resist pattern. This insulating film is patterned and formed into the second passivation film 24. Exposed portions of the insulating film, the passivation film 10, and the gate insulating film 9 are selectively etched with the resist pattern as the mask, and the source electrode 2b is exposed through the contact hole 7. At the same time, more contact holes are formed on the G-D conversion portion and on the terminal portion.

Figure 11B:
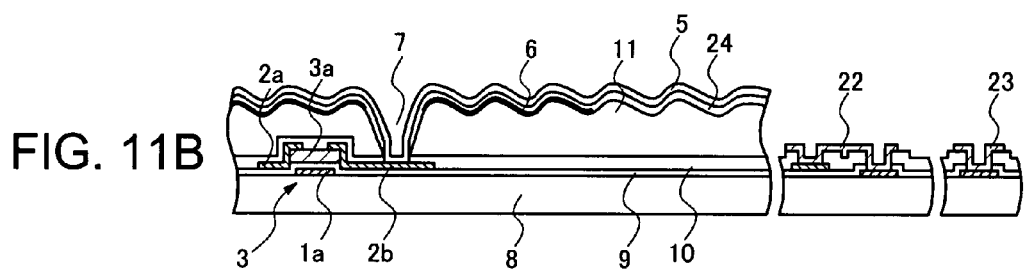

Next, as shown in FIG. 11B, a transparent conductive film such as ITO is deposited on the entire surface in accordance with the sputtering method or the like, and the transparent electrode film 5 that covers the entire surface of each pixel, a G-D conversion portion electrode 22, and a terminal electrode 23 are formed at the same time by use of a resist pattern. Here, in order to prevent an electrolytic corrosion reaction of the reflective film 6 located below, the transparent electrode film 5 is formed so as to cover the entire surface of the reflective film 6. Particularly, the transparent electrode film 5 is formed such that its edges protrude above the gate lines 1 and the data line 2. By applying the laminated structure and the layout structure of the reflective film 6 and the transparent electrode film 5 as described above, it is possible to prevent the reflective film 6 from contacting the developer.

In this embodiment, the second passivation film 24 is formed between the reflective film 6 and the transparent electrode film 5. As the reflective film 6 is electrically floating, there is a concern of variation in the electric potential of the reflective film 6 attributable to the gate voltage or the like to be applied to the TFT 3. However, by forming the concavo-convex film 11 on the TFT 3 as described previously, it is possible to secure the distance between the TFT 3 and the reflective film 6 with this concavo-convex film 11 and thereby to relieving the influence of the TFT 3 on the reflective film 6 sufficiently. Thereafter, the alignment film 29 made of polyimide is formed on the transparent electrode film 5, thereby finishing the active-matrix substrate 12.

Next, the counter substrate 16 is prepared by forming the color filter 14, the black matrix (not shown), the counter electrode 15, the alignment film 29, and the like sequentially on the transparent insulating substrate 13.

Then, the liquid crystal layer 17 is inserted between the two substrates 12 and 16 and then the substrates are attached to each other. Furthermore, the retarders 20a and 20b and the polarizers 19a and 19b are placed on both sides of the substrates. 12 and 16, respectively. Moreover, the backlight source 18 is located on the back side of the polarizer 19a placed on the active-matrix substrate 12. In this way, the semi-transmissive reflective LCD device is manufactured as shown in FIG. 9.

As described above, according to the semi-transmissive reflective LCD device and the manufacturing method thereof according to this embodiment, it is possible to condense the light efficiently toward a viewer by use of the reflective film 6 formed on the concavo-convex film 11 having the smaller tilt angle or the longer slope at the tilted portion on the light incident side as similar to the first exemplary embodiment. Therefore, it is possible to obtain a high reflection characteristic with enhanced visibility. Moreover, upon formation of the concavo-convex film 11, it is possible to form three regions having different exposure amounts at one session of exposure by use of the photomask that includes the light-shielding region 31a provided with the pattern in the size equal to or larger than the resolution limit, the first transmissive region 31b provided with the pattern in the smaller size than the resolution limit, and the second transmissive region 31c without patterns. In other words, since it is to 2.9 µm. By setting the film thickness of the concavo-convex film 11 approximately equal to 1.4 µm (=2.9 µm−1.5 µm), the cell gap dr in the reflective region PXb is set an optimum value of about 1.5 µm. To realize this structure, the condition for coating the photosensitive acrylic resin is adjusted upon formation of the concavo-convex film 11 in the step illustrated in FIG. 10B so as to achieve the film thickness of about 1.4 µm, for example. Moreover, the exposure process may be conducted to form the contact hole 7 in the photosensitive acrylic resin on the source electrode 2b and to remove the photosensitive acrylic resin in the transmissive region PXa at the same time in the same manner. In this way, the photosensitive acrylic resin in the transmissive region PXa is removed in the subsequent development process. Thereafter, the steps substantially similar to those described above are carried out. Eventually, it is possible to manufacture the semi-transmissive reflective LCD device as shown in FIG. 12, which is compatible to the twist angle of about 0° by setting the reflection cell gap dr in the reflective region approximately equal to 1.5 µm and the transmission cell gap df in the transmissive region approximately equal to 2.9 µm.

Although this embodiment describes the method of manufacturing the semi-transmissive reflective LCD device, it is also possible to manufacture a reflective LCD device by forming the pixel region PX entirely as the reflective region PXb. Moreover, this embodiment describes the case of applying the reflector explained in the first exemplary embodiment to the LCD device. However, the present invention is not limited only to this embodiment. It is to be noted that the present invention is also applicable to other reflectors for various purposes which include a function to enhance optical reflectance in a certain direction.

Although the preferred embodiments of the invention has been described with reference to the drawings, it will be obvious to those skilled in the art that various changes or modifications may be made without departing from the true scope of the invention. For example, instead of placing the color filter 14 on the counter substrate 16, it is possible to place the color filter 14 on the active-matrix substrate 12. When the LCD device is of a black-and-white type, it is possible to omit the color filter.

The above-described embodiment provides the LCD device including the electrically floating reflective film 11 on the surface of the concavo-convex film 11. Instead, it is also possible to apply the present invention to a reflective or semi-transmissive reflective LCD device in which the reflector itself constitutes a reflective pixel electrode that is electrically connected to the source electrode 2b of the TFT 3. That is, it is also possible to form the reflective pixel electrode by connecting the reflector directly to the source electrode 2b of the TFT 3. Alternatively, it is also possible to form a reflective pixel electrode by allowing the reflector to contact the transparent electrode film 5 while connecting the transparent electrode film 5 directly to the source electrode 2b of the TFT 3. No matter whether the subject is the electrically floating reflective film 6 or the reflective pixel electrode, it is possible to reflect the incident light efficiently toward a view and thereby to obtain a bright reflection characteristic by forming the subject on the concavo-convex film 11 of this embodiment.

What is claimed is:

1. A method of manufacturing a reflector for reflecting incident light from outside comprising the steps of:
    coating photosensitive resin on a substrate;
    exposing the photosensitive resin by use of a photomask, the photomask including a light-shielding region where a piece of a pattern is formed in a size equal to or larger than a resolution limit,
    a first transmissive region where a piece of a pattern is formed in a size smaller than the resolution limit, and
    a second transmissive region having higher optical transmittance than the first transmissive region, wherein a part of the first transmissive region is located between the light-shielding region and the second transmissive region;
    performing development of the photosensitive resin after the exposure and then forming three regions having different film thicknesses;
    subjecting the photosensitive resin to a heat treatment after the development; and
    forming a reflective film on the photosensitive resin after the heat treatment.

2. The method of manufacturing a reflector according to claim 1, wherein
    the photomask comprises a pattern in which any of polygons, circles, and ellipses are arranged in a plane direction,
    sides of any of the polygons, circles, and ellipses constitute the light-shielding region, and
    the first transmissive region is located adjacent to the light-shielding region.

3. The method of manufacturing a reflector according to claim 1, wherein
    the photomask comprises a pattern in which any of wavy lines and winding lines are arranged in a plane direction,
    any of each of the wavy lines and of the winding lines constitutes the light-shielding region, and
    the first transmissive region is located adjacent to the light-shielding region.

4. The method of manufacturing a reflector according to claim 1, wherein
    the photomask comprises a pattern in which any of polygons, circles, and ellipses are arranged in a plane direction,
    a side of any of each polygon, circle, and ellipse constitutes the second transmissive region, and
    the first transmissive region and the light-shielding region are located adjacent to each other in areas surrounded by sides of any of the polygons, circles, and ellipses.

5. The method of manufacturing a reflector according to claim 1, wherein
the photomask comprises a pattern in which any of wavy lines and winding lines are arranged in a plane direction,
any of each wavy line and winding line constitutes the second transmissive region, and
the first transmissive region and the light-shielding region are located adjacent to each other at portions other than any of the wavy lines and winding lines.

6. The method of manufacturing a reflector according to claim 1, wherein a piece size of the pattern is smaller than the resolution limit, and the pattern is changed stepwise in the first transmissive region.

7. The method of manufacturing a reflector according to claim 1, wherein a light-shielding pattern is not formed in the second transmissive region.

* * * * *